Dec. 12, 1944. J. DUGAN 2,364,625
RADIO CONTROLLED NAVIGATIONAL SYSTEM
Filed Sept. 18, 1941 5 Sheets-Sheet 1

Dec. 12, 1944.   J. DUGAN   2,364,625
RADIO CONTROLLED NAVIGATIONAL SYSTEM
Filed Sept. 18, 1941   5 Sheets-Sheet 4

Inventor
Joseph Dugan

Patented Dec. 12, 1944

2,364,625

UNITED STATES PATENT OFFICE 2,364,625

RADIO CONTROLLED NAVIGATIONAL SYSTEM

Joseph Dugan, Los Angeles, Calif., assignor of one-half to Evelyn R. Dugan, Los Angeles, Calif.

Application September 18, 1941, Serial No. 411,408

19 Claims. (Cl. 250—2)

This invention is an improvement in the Direction and position indicating system disclosed in my United States Patent No. 1,959,264, May 15, 1934; and, this application is a continuation-in-part of my application Serial No. 361,639 for Radio controlled steering system, filed October 17, 1940. The subject matter common to these two applications includes mechanism on a mobile craft, automatically controlled by energy derived from two spaced apart radio transmitting stations, for steering such craft automatically on to, and in drift-corrected movement in a predetermined direction along, a straight course passing through said stations. It also includes means controlled by energy derived from a third radio transmitting station, at one side of said course, for continuously indicating the position of the craft on that course.

In its broadest aspect, this invention relates to a system in which direction determining devices (telescopes, directional radio antennae, directional gyroscopes and the like) are mounted on a mobile craft to rotate independently about normally vertical axes and are operably connected either to indicating mechanism to enable a pilot to steer the craft manually, or to mechanism for steering the craft automatically, on to and in drift-corrected movement in a predetermined direction along, a straight course passing either through two spaced apart objects (radio transmitters, light beacons etc.) upon which two of said devices are separately held trained, or along any predetermined compass course through any of said objects.

The main object of the present invention is to simplify the craft-steering operations of the systems disclosed in my said patent and pending application, by the substitution of a pilot director having a single steering pointer reading against a single lubber-line for the dual pointer steering indicator disclosed in said patent and pending application.

Another object of this invention is to provide apparatus of this type with means adjustable, alternatively, to arrange the steering mechanism of the craft for manual or automatic control without interfering with the operation of the single-pointer steering indicator.

A further object of this invention is to provide apparatus of this type with means for continuously indicating the ground speed, angle of drift and position of the craft on said course, as well as the distances traversed between any selected points thereon.

Other objects of the invention will become apparent as the detailed description thereof proceeds.

For proper understanding of the principles involved in the steering of mobile craft in accordance with this invention, from any location within in range of the course-defining objects, on to and in drift-corrected movement in a predetermined direction along a straight course passing through two of such objects, it will be necessary to consider the space on opposite sides of said course as divided into three zones by planes perpendicular to said course at the course-defining objects. In the intermediate zone, the craft moves between the two course-defining objects. In one of the outer zones, the craft moves toward both objects; and, in the other outer zone, the craft is considered as moving away from both objects.

Figures 4, 5, 6:
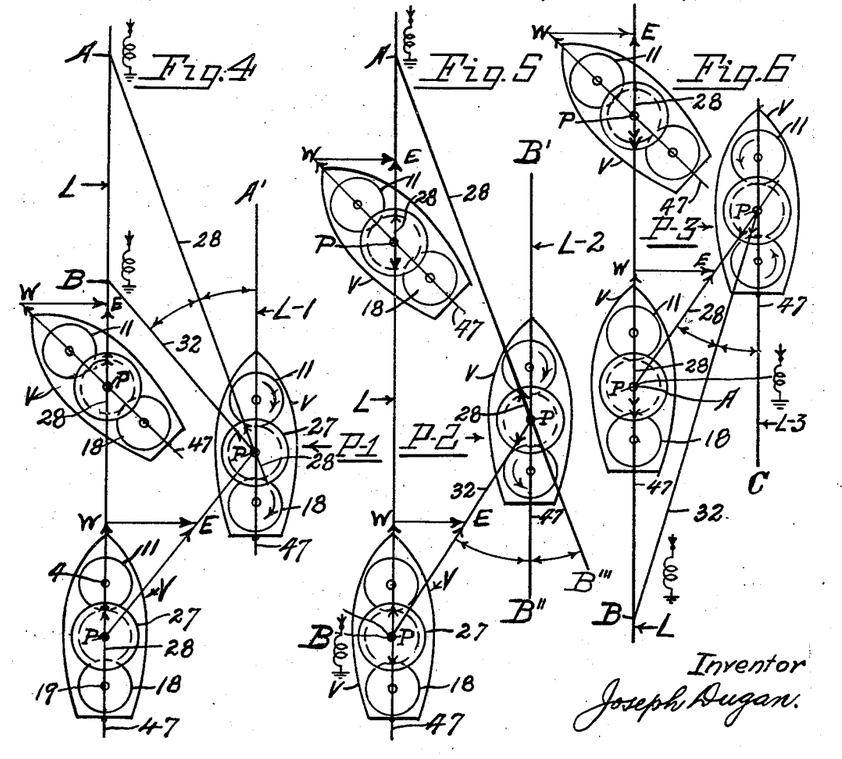
Figs. 4, 5 and 6 are diagrams used to explain the underlying principle involved in the operation of the steering mechanism disclosed in Figs. 1, 2 and 3.

With this division into zones understood, the principle involved, and as illustrated in Figs. 4, 5 and 6, requires: (1) that when the craft is in drift-corrected movement along the desired straight-line course, the rudder of the craft must be zero-centered (alined with the fore-and-aft axis); (2) that regardless of the headings of the craft, when it is located in either of the outer zones and is laterally displaced to the right of said course (looking along the course in the desired direction of movement), the rudder must be continuously adjusted clockwise from zero-center through angles proportional to the continuously varying differences between the exterior and interior-opposite angles at the fixed base of the triangles formed by drawing straight lines to the laterally displaced craft from the two spaced apart course-defining objects; (3) that, regardless of the headings of the craft, when it is located in the intermediate zone and is laterally displaced to the right of said course, the rudder must be adjusted continuously clockwise through angles proportional to the continuously varying sums of the interior angles at the fixed base of the triangle formed by drawing straight lines from the spaced apart course-defining objects to the laterally displaced craft.

The same principle is involved in the continuously varying adjustments of the rudder when the craft is located to the left of the desired course; except that in this event, the rudder must be adjusted counter-clockwise, instead of clockwire, from zero-center.

The matter of determining or indicating the position of the craft during its movements along a straight course passing through two spaced apart course-defining objects is suggested in my aforesaid U. S. Patent 1,959,264 and involves the idea of continuously orienting a base plate or dial to maintain a reference line on that dial continuously alined with said course. With a dial so oriented, the continuous determination and indication of the position of the craft on said course may be carried out by setting up on said dial a representation in miniature of the angles formed with said reference line by a straight line drawn from the craft, as it proceeds on its course, to a third object located on either side of the course, and by causing an arm or indicator to rotate through the same angles over this miniature representation and indicate, on a suitably calibrated scale, the position of the craft on its said course.

This method of determining and indicating the position of the craft on a dial which changes its position with every change in the angle of drift, is fully described in my aforesaid co-pending application. In this case, this objection to indicating movements on a continuously moving (oriented) dial is eliminated by compensating for the angles of drift of the craft, and transmitting to fixed position and ground speed measuring devices nothing but the angles which the rotating indicator or arm makes with the reference line on the oriented dial.

The system disclosed in Figs. 1 to 6 of the drawings, is designed to steer a craft automatically from any location on to and in drift-corrected movement in either direction along the straight course L passing through two radio transmitters A and B of different frequencies. (See Figs. 4, 5 and 6.) The steering mechanism mounted on the craft includes two automatic (self-orienting) radio compasses designated generally by the reference numerals 1 and 2. These automatic compasses are now well known and have been in common use for several years on the airlines of the United States. They are shown and described in detail on pages 250 to 257, inclusive, and pages 305–306 of Aircraft Radio and Electrical Equipment, by Howard K. Morgan, published in 1939 by Pitman Publishing Company of New York; and, are also fully disclosed in my aforesaid U. S. Patent 1,959,264; in the German patent to Dieckmann No. 555,826—1932; and British Patents Nos. 523,093 and 523,953 accepted July 14 and 26, 1940, respectively, and based on the corresponding U. S. patent to Moseley 2,257,757 October 7, 1941.

Figure 1:
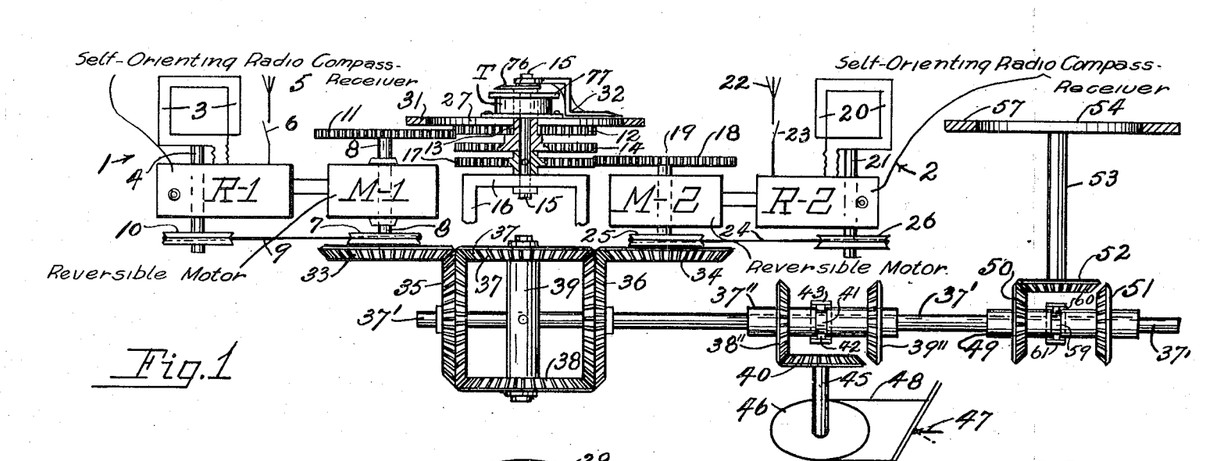
Fig. 1 is a diagrammatic layout, in elevation, of the apparatus used for steering mobile craft on to and in drift-corrected movement in a predetermined direction along a straight course passing through two spaced apart radio transmitters, and for operating mechanism to indicate the position of the craft on that course and its ground speed.
Figure 2:
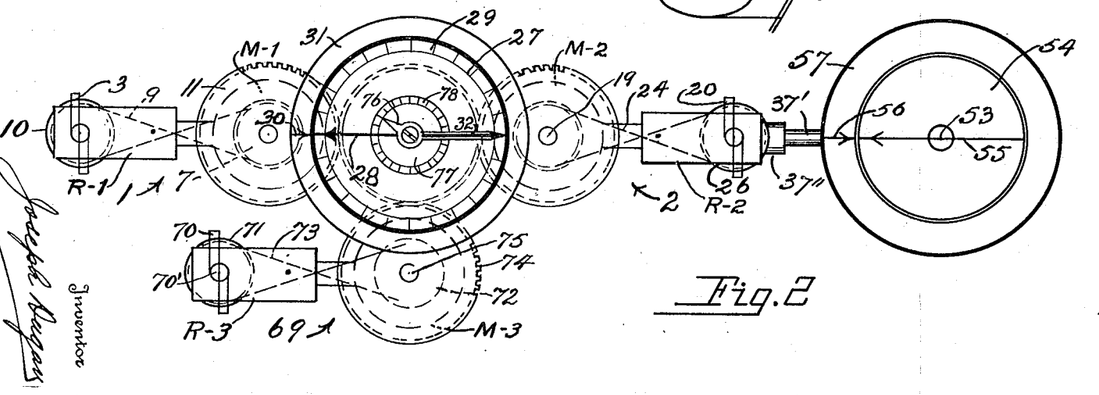
Fig. 2 is a diagrammatic layout, in plan, of the apparatus shown in Fig. 1.

As shown in Figs. 1 and 2, the compass 1 includes: the receiver R-1, tunable to the frequency of either transmitter A or B; a loop antenna 3 mounted on a shaft 4 for rotation about a normally vertical axis; and a sense antenna 5 connected to the receiver R-1 through the switch 6. The output of the receiver R-1 operates the follow-up motor M-1 to effect rotation of the grooved pulley 7 fixed to the lower end of the motor shaft 8. A cable 9 transmits the rotation of the pulley 7 to a similar pulley 10 fixed to the lower end of the loop-supporting shaft 4, and thereby maintains the loop 3 with its plane constantly perpendicular to a straight line joining the transmitter A to the receiver R-1. A gear 11, fixed to the other end of shaft 8, meshes with a similar gear 12 mounted to rotate on a sleeve 13 extending upwardly from a gear 14, which, in turn, is mounted to rotate on a shaft 15 rotatable on a bearing frame 16.

The shaft 15 is rotated by means of a gear 17 in mesh with a gear 18 fixed to the upper end of the rotor shaft 19 of the motor M-2 which is operably controlled by the output of the receiver R-2 of the automatic radio compass 2. The receiver R-2, tunable to the frequency of the transmitter B, includes the loop antenna 20 mounted on the shaft 21 for rotation about a normally vertical axis, a sense antenna 22 being connected to the receiver R-2 through the switch 23. Rotation of the loop-supporting shaft 21 is effected through the crossed cable 24 connecting the grooved pulleys 25 and 26 which are fixed, respectively, to the lower ends of the shaft 19 and 21.

Figure 11:
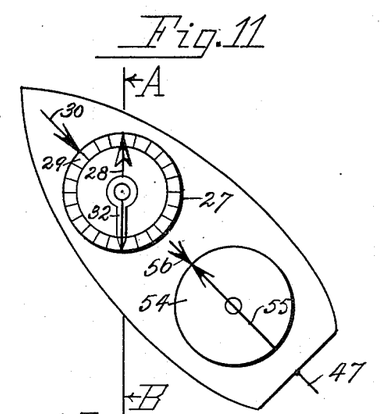
Fig. 11 is a diagram illustrating, by comparison, the operation of the single and dual-pointer indicators.

A dial 27, fixed to the gear 12 to rotate about the sleeve 13, is provided with a diametral pointer or indicator line 28, and with a drift angle scale 29 (see Figs. 2 and 11) readable against a lubber line 30 on a fixed part 31 of the craft. A transmitter T is fixed to the dial 27 and has its rotor coils (not shown) mounted on an extension of the sleeve 13. The shaft 15 extends through this sleeve and has a pointer 32 fixed to its upper end for alinement with the pointer or indicator line 28 when the craft lies on the course L. The dial 27 with its indicator 28 and the cooperating indicator 32 constitutes a pilot director which enables the pilot to determine the location of the craft relative to the desired course.

To adapt this apparatus for automatic steering, the lower ends of the motor shafts 8 and 19 have the bevel gears 33 and 34 fixed respectively thereto and in mesh with the adjacent differential gears 35 and 36 which are rotatably mounted on the shaft 37'. These gears 35 and 36 mesh with the bevel gears 37 and 38 on the opposite ends of the differential spider 39 pinned to the shaft 37' to complete the differential gear set. A sleeve 37'' is splined on the shaft 37' to slide thereon and rotate therewith. Bevel gears 38'' and 39'', secured to this sleeve 37'', are arranged for movement alternatively into or out of mesh with one side or the other of the bevel gear 40.

The sleeve 37'' may be locked by lever mechanism, hereinafter described, in an intermediate position, with the gears 38'' and 39'' clear of the gear 40, to permit manual control of the rudder mechanism when desired. The sleeve 37'' has a circumferential groove 41 formed therein to receive the pins 42 extending radially inward from the opposite arms 43 of a yoke formed on one end of a clutch-throw lever 44. (Shown diagrammatically in Fig. 3.) The gear 40 is fixed to the upper end of a shaft 45 to which is fixed the pulley 46 operably connected to the rudder 47 by the cable 48.

The direction of movement of the clutch sleeve 37'' to cause one or the other of the gears 38 or 39 to mesh with the gear 40 depends upon the location of the transmitters A and B relative to the craft as it proceeds in one direction or the other on the course passing through said transmitters. The reasons for this dependance and the necessity for using the differential gearing will appear from consideration of the diagrams shown in Figs. 4, 5 and 6. In these diagrams, the craft is indicated by the reference character V; the solid circle at the bow of the craft represents the gear 11 of the motor M-1; the solid center circle represents the dial 27 which is fixed to the gear 12 in mesh with gear 11; the smaller broken circle at the center represents the gear 17 fixed to the shaft 15 having the pointer 32 secured to its upper end for rotation over the dial 27; and, the smaller circle at the stern represents the gear 18 fixed to the rotor shaft 19 of the motor M-2 to effect rotation of the pointer 32 through the gear 17 and shaft 15.

Fig. 4 illustrates the craft V as starting in movement toward the transmitter B from a starting point S along a straight course L passing through the transmitters B and A. As initially installed on the craft, the apparatus will be mounted with the indicator or reference line 28 and the pointer 32 in alinement with each other and with the fore and aft axis of the craft, or with a lubber-line representing that axis. At the starting point S, the craft is headed along the course L under air-speed PW, and is subjected to a side wind WE which will cause the craft to "crab" or drift at ground speed PE eventually to the position P-1, unless this heading be changed in the meantime to correct for this drift. In position P-1, the craft lies to the right of the course L and is headed along the line L-1 parallel to the course L; consequently, the rudder 47 must be moved to the left (clockwise) in order to steer the craft toward the desired course L.

If in this position P-1 of the craft, the receivers R-1 and R-2 are tuned to the frequencies of the transmitters A and B, respectively, the gear 11 will be rotated clockwise by the motor M-1 through the angle A'PA to impart a counter-clockwise rotation through the same angle A'PA to the dial 27 and its indicator reference line 28 which is represented in Figs. 4, 5 and 6 by the line PA. Similarly, the gear 18 will be rotated clockwise by the motor M-2 through the angle A'PB to impart a counter-clockwise rotation through the same angle A'PB to the pointer 32 which is represented in Figs. 4, 5 and 6 by the line PB.

Clockwise rotation of the gear 18 is obviously accompanied by clockwise rotation of the bevel gears 34 and 36 through the angle A'PB; while clockwise rotation of the gear 11 and its connected gear 33 causes counter-clockwise rotation of the differential gear 35 through the smaller angle A'PA. Obviously, the result is a clockwise rotation of the differential spider 39 and the shaft 37' through the angle A'PB minus the angle A'PA; that is, a clockwise rotation of the shaft 37' through the angle APB which is clearly equal to the difference between the exterior and interior-opposite angles at the base BA of the triangle formed by drawing straight lines from the transmitters A and B to the craft V in its laterally displaced position P-1. Since the rudder 47 must be rotated clockwise to steer the craft toward the line L, it is apparent that the sleeve 38 must be moved to cause engagement of the gears 39 and 40.

It is obvious that drift of the craft V to the left of the course L, instead of to the right, will call for opposite rotations of the receiver loops, the gears 11 and 18 of the reversible motors M-1 and M-2, and rudder 47. Therefore, the gears 39 and 40 must remain in mesh while the craft is in movement toward the transmitters A and B on either side of the course L.

In order to steer the craft from the position P-1 on to the line L and in drift-corrected movement along that line in the direction BA, the rudder 47 must be rotated clockwise through an angle proportional to the angle APB. Then, when the craft moves toward the line L, the angle APB becomes smaller and smaller and the rudder angle decreases proportionally; until, finally, the angle APB vanishes, the lines AP and BP coincide; and the craft "crabs" along the course L, headed into the wind WE at the drift angle WPE under air-speed PW and ground-speed PE, with the rudder 47 alined with the fore-and-aft axis. The correction for drift is thus completely automatic, and the track of the craft eventually approaches the desired drift-corrected course L through the transmitters A and B asymptotically.

In Fig. 5, the craft V is shown as starting from the transmitter B toward the transmitter A under a cross wind WE and at air-speed PW, or headed along the course L. If this heading be maintained, the craft will eventually arrive at the position P-2 with its fore-and-aft axis lying in the line L-2 parallel to the course line L. With the craft in position P-2, it is evident that the motor M-1 must have rotated the gear 11 clockwise through the angle P'PA to cause counter-clockwise rotation of the dial 27 and its indicator reference line 28 through the same angle B'PA. It is also evident that the motor M-2 must have rotated the gear 18 counter-clockwise through the angle B''PB to cause clockwise rotation of the pointer 32 through the same angle B''PB. This means that the dial 27 and pointer 32 rotate in opposite directions when the craft V is laterally displaced from the course L during its flight between the transmitters A and B.

Counter-clockwise rotation of the motor M-2 and its associated bevel gear 34 causes counter-clockwise rotation of the differential gear 36 and spider 39; and, clockwise rotation of the motor M-1 and its associated gear 33 causes counter-clockwise rotation of the differential gear 35 and spider 39. This means that the angles B'PA and B''PB are added in the differential to rotate the shaft 37' counter-clockwise through the sum of the angles B'PA and B''PB; or, the angle B'''PB which is obviously equal to the sum of the interior angles at the base BA of the triangle formed by drawing straight lines from the transmitters A and B to the craft in its laterally displaced position P-2. The necessary clockwise adjustment of the rudder 47 through an angle proportional to the angle B'''PB requires a shift of the sleeve 37 to mesh the gears 38 and 40, as shown in Fig. 1.

In Fig. 6, the craft is shown as headed for movement along the course L away from both transmitters A and B. If this heading be maintained, the craft will eventually arrive at the position P-3 headed along the line L-3 parallel to the course L. If the receivers R-1 and R-2 be now tuned to the frequencies of the transmitters A and B, respectively, the dial 27, with its reference line 28, and the pointer 32 will rotate through the angles C'PA and C'PB, respectively. The necessary counter-clockwise rotation of the motor M-1 and its associated gear 33 causes a clockwise rotation of the differential gear 35 and spider 39 through the angle C'PA; while the counter-clockwise rotation of the motor M-2 and its associated gear 34 causes counter-clockwise rotation of the differential gear 36 and spider 39 through the smaller angle C'PB. The result is a clockwise rotation of the shaft 37' through the angle C'PA minus the angle C'PB; or, the angle BPA, which is clearly equal to the difference between the exterior and interior-opposite angles at the base BA of the triangle formed by drawing straight lines from the transmitters A and B to the craft in its laterally displaced position P-3. In this case, since the shaft 32 rotates clockwise, it will be necessary to shift sleeve 37 to mesh gear 39 with gear 40 to effect clockwise adjustment of the rudder 47 through an angle proportional to the angle BPA.

It will be apparent from inspection of Figs. 4, 5 and 6, that the angles formed by the straight lines drawn from the transmitters A and B to the laterally displaced craft, are independent of the headings of the craft. This means that, regardless of the headings of the craft in any of its laterally displaced positions, the automatic pilot will steer the craft from any such position (within range of the transmitters) on to and in drift-corrected movement in a predetermined direction along the course L. For example, if the craft in position P-1 were headed in a direction opposite to that shown in Fig. 4, the adjustment of the rudder 47 would still be clockwise and proportional to the angle APB, and would first cause the craft to swing counter-clockwise and somewhat spirally away from the course L through an angle of 180 degrees; and thence on a path eventually tending asymptotically toward the course L into drift-corrected movement along that course in the direction BA.

The direction of movement of the craft along the course L, is determined by the tunings of the receivers R-1 and R-2. If the receivers R-1 and R-2 are tuned to the frequencies of the transmitters A and B, respectively, the craft will move in the direction BA. If the receivers R-1 and R-2 are tuned to the frequencies of the transmitters B and A, respectively, the craft will move in the direction AB. The rule is that the direction of movement of the craft along the course L is that direction in which the transmitter to which the receiver R-1 is tuned lies ahead of the transmitter to which the receiver R-2 is tuned.

To render manual control of the craft easier for the pilot, the apparatus includes a second sleeve 49 splined on the shaft 37' to slide thereon and rotate therewith. Gears 50 and 51 are fixed to the sleeve 49 for movement alternatively into or out of mesh with the gear 52 which is fixed to the lower end of a shaft 53 having the steering dial 54 secured to its upper end. This dial 54 is provided with a single pointer or indicator 55 arranged for alinement with the fixed Lubber-Line 56 only when the craft is located on the course L.

From inspection of Fig. 1, it will be obvious that the dial 54 rotates in a direction opposite to that of the rudder 47 and through angles proportional to the angles of rotation of the shaft 37'. It is obvious, therefore, that the dial 54 with its single pointer 55, cooperating with the fixed lubber line on a fixed part 57 of the craft, may be used instead of the two relatively rotatable indicators 28 and 32 to steer the craft on to and in drift-corrected movement in a predetermined direction along the course L defined by the transmitters A and B.

The gears 50 and 52, like the gears 38 and 40, are shown in Fig. 1 in positions required for operation in the intermediate zone—between stations A and B. When in operation in either of the outer zones, it will evidently be necessary to shift the sleeve 49 to mesh the gear 51 with the gear 52. To ensure continuous operation of the steering dial 54, even when the rudder 47 is freed for manual control, the sleeves 37'' and 49 are linked together as shown in Fig. 3.

Figure 3:
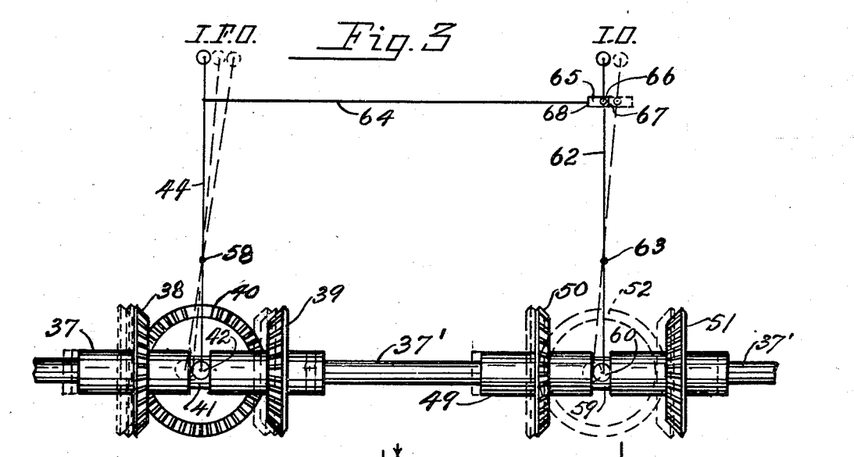
Fig. 3 is a fragmentary diagram illustrating the mechanism for adjusting the steering apparatus, alternatively, for either manual or automatic control.

To avoid confusion in the drawings, the yoke arms 43 at one end of the lever 44 are omitted in Fig. 3 and the yoke end of this lever is illustrated as terminating in the axis of one of the pins 42. The lever 44 is mounted to rock about the fixed pivot 58 into the three different positions indicated by the letters I, F and O. In position I of the lever 44, the gears 38 and 40 are meshed for operation in the inner zone (between transmitters A and B); and, in position O, the gears 39 and 40 are meshed for operation in either of the outer zones. In position F, the gear 40 is free of both gears 38 and 39; and, the craft is conditioned for manual control.

The slide 49 is provided with a circumferential groove 59 to receive the pins 60 which extend radially inward from the yoke arms 61 formed at one end of the clutch throw lever 62. (See Fig. 3.) The lever 62 is mounted to rock about a pivot 63 fixed at the same distance from the shaft 37' as the pivot 58. The yoke arms 61 are also omitted in Fig. 3, and the lever 62 is illustrated as ending in the axis of one of the pins 60.

A link 64, substantially parallel to the shaft 37', is pivoted at one end to the outer arm of lever 44 and is shaped at its other end to form a lost-motion slot 65 which slidably receives a pin 66 extending laterally from the lever 62. When the steering mechanism is set for automatic operation in the intermediate zone, the levers 44 and 62 are substantially parallel as shown in Fig. 3, with the gears 38 and 50 in mesh with gears 40 and 52, respectively.

When the lever 44 is in the full-line position shown in Fig. 3, with the gears 38 and 40 meshed, the outer end 67 of the slot 65 contacts with the pin 66 and holds the lever 62 in position to keep gears 50 and 52 in mesh. When the lever 44 is thrown to position F the gear 40 is clear of both gears 38 and 39, with the rudder free for manual control. The slot 65 is of such length that the inner end 68 thereof merely moves into contact with the pin 66 when the lever 44 is thrown from position I to position F. This means that while the rudder is free for manual control, the steering dial 54 is still connected for operation in the intermediate zone.

A further throw of the lever 44 from position F to position O will not only shift the gear 39 into mesh with the gear 40, but will also throw the lever 62 from position I to position O and thereby shift the slide 49 to mesh the gear 51, instead of gear 50, with the dial-operating gear 52. With both levers 44 and 62 in the O position, the steering and indicating mechanism is obviously set for operation in either of the outer zones.

From inspection of Fig. 3, it will be apparent that when the lever 44 is in the I (inner zone) position, the lever 62 must also be in the I position; and, that when the lever 44 is in the O position, the lever 62 must also be in this O (outer zone) position. It is obvious that the lever 62 must be in either the I or O position when the lever 44 is in the F (free) position; and the pilot may throw the lever 62 into either position as required for operation in the particular zone in which the craft may be located. Any suitable means may be used for locking the levers 44 and 62 releasably in their various adjusted positions.

For determination of the ground speed and position of the craft V on the course L, a third radio transmitter S-1 at one side of the craft is required to control the operation of a third automatic radio compass arranged on the craft to cooperate with compasses 1 and 2. A possible relative arrangement of the three automatic radio compasses is shown in Figs. 1 and 2; and a possible arrangement of a third radio transmitter relative to the course L is shown in Fig. 9.

In Fig. 2, the rectangle R-3 and connected circle M-3 form parts of a complete self-orienting radio compass 69 similar in every respect to the compasses 1 and 2 shown on opposite sides of the shaft 15 in Fig. 1. The motor M-3 is used to rotate a third loop 70 on the loop-supporting shaft 70' by means of the grooved pulleys 71 and 72 and connecting cable 73. A gear 74 fixed to the upper end of the shaft 75 of motor M-3 meshes with the gear 14 (see Fig. 1) to impart rotation to the sleeve 13 which constitutes the rotor shaft of the transmitter T, the stator of which is fixed to the dial 27. The receiver R-3 is tuned to the frequency of the third transmitter S-1 to cause the pointer 76, fixed to the upper end of sleeve 13, to point continuously in a direction representing the direction of the transmitter from the craft. The diametral line 28 is continued over the upper face of the transmitter T which then serves as a dial 77 having a scale 78 formed thereon to indicate, with the pointer 76, the position of the craft V as it proceeds along the course L represented by the line 28.

Figure 9:
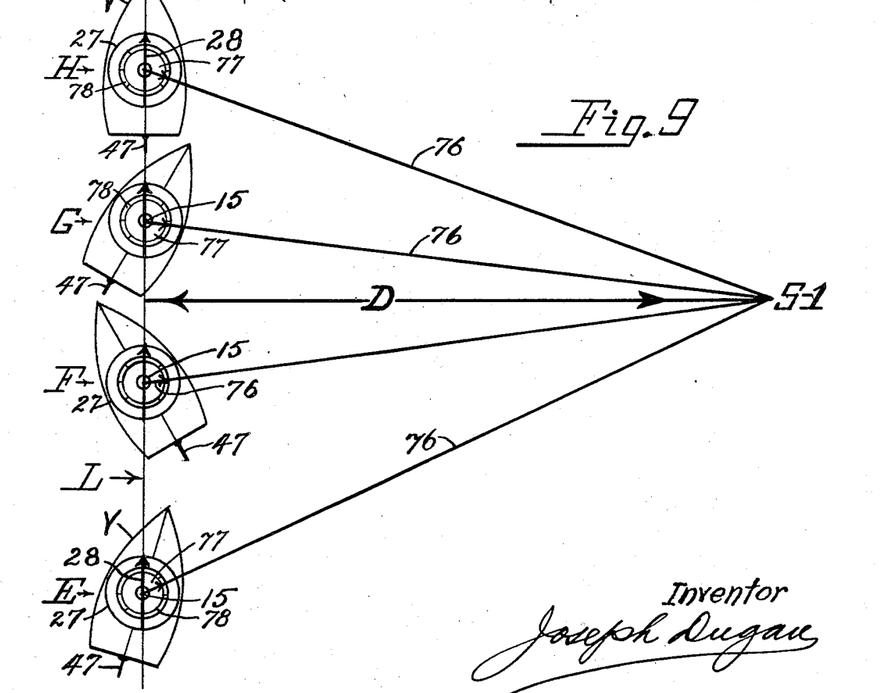
Fig. 9 is a diagram illustrating the principle involved in the operation of the ground speed and position indicating mechanism shown in Fig. 8.

From inspection of Fig. 9, it is evident that as the craft moves along the course L through the points E, F, G and H, the pointer 76 and the line joining the transmitter S-1 to the axis of the shaft 15 appear to rotate clockwise over the dial 77. Therefore, in marking the graduations 78 on the dial 77 to represent the locations of the points E, F, G and H on the course L, it will be necessary to arrange them so that lines joining them to the center of the dial 77 are at the same angles to the reference line 28 as the corresponding lines S-1E, S-1F, S-1G, and S-1H occupy relative to the line L. In other words, the graduations of the scale 78 are arranged on the dial 77 to reproduce in miniature the conditions in space represented in Fig. 9.

Figure 7:
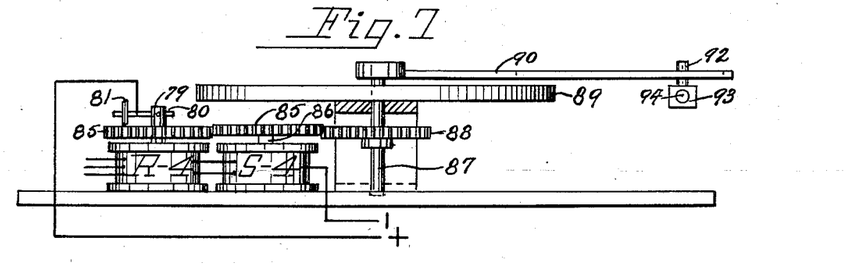
Fig. 7 is a vertical section taken on the line 7—7 of Fig. 8.
Figure 8:
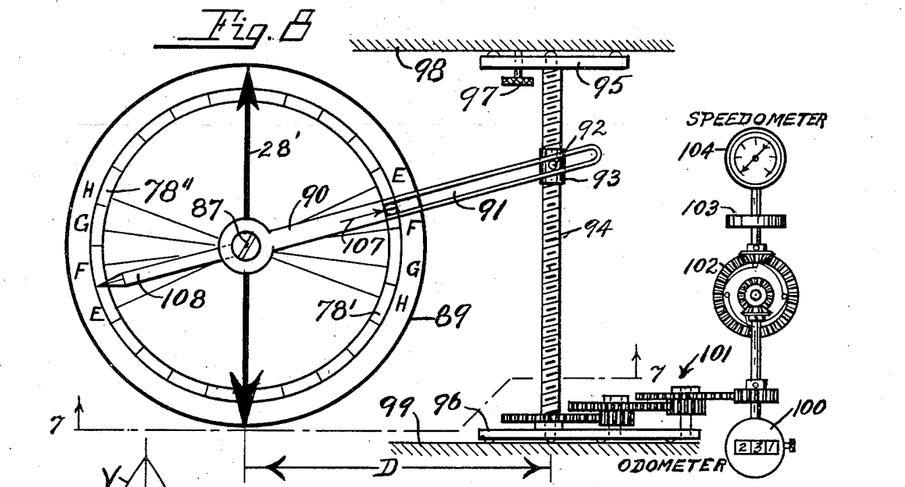
Fig. 8 is a fragmentary plan of ground speed and position indicating mechanism connected for operation by the apparatus shown in Figs. 1 and 2.

The position and ground speed indicating apparatus illustrated in Fig. 8 is intended to be fixed to the craft V. To derive correct indications of ground speed and position on this fixed apparatus from the continuously moving radio controlled members of the apparatus shown in Figs. 1 and 2, only the movements of the pointer 76 relative to the reference line 28 are transmitted to the repeater R-4. (See Fig. 7.)

The rotor shaft 79 of the repeater R-4, rotating in synchronism with the rotor shaft of the transmitter T, rotates the conducting arm 80 with its trolley 81 on to one or the other of the conducting segments 82 and 83, separated by the usual central insulating strip 84'. (See Fig. 10.) The plates 82 and 83 are arranged on and insulated from the gear 84 which rotates on shaft 79 and meshes with a similar gear 85 fixed to the shaft 86 of the servo-motor S-4 operable in one direction or the other by the movements of the arm 80 over the plates 82 or 83.

Figure 10:
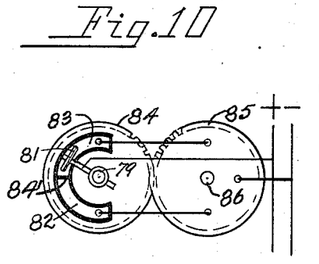
Fig. 10 is a wiring diagram.

A shaft 87, rotated by means of the gear 88 in mesh with gear 85, extends through the fixed scale plate 89 which is provided with an indicator reference line 28' and a position scale 78' similar to the scale 78 on the dial 77. An arm 90, fixed to the upper end of shaft 87, rotates over the scale 78' to reproduce the movements of the pointer 76 over the position scale 78, and is provided with a slot 91 to receive a pin 92 extending from a nut 93 mounted on the screw 94.

The screw 94 is mounted to rotate in supporting slides 95 and 96 to adapt the screw 94 for adjustment toward and from the axis of the shaft 87 to positions corresponding to the perpendicular distance D of the transmitter S-1 from the course L. A clamping screw 97 may be used to lock the screw 94 in adjusted position between the fixed supports 98 and 99. It will be apparent from inspection of Figs. 8 and 9, that the apparatus shown in Fig. 8 is intended to represent, in miniature, the conditions in space indicated in Fig. 9.

The effective length of the screw 94 is a measure of the distance traversed by the craft, and the speed of angular rotation of the screw is a measure of the ground speed of the craft on the course L. The amount of rotation of the screw 94 is a measure of the distance traversed by the craft V on the course L and is indicated by the odometer 100 to which the screw is shown as connected by the gearing 101. An over-running clutch 102 and fly-wheel 103 are interposed between the gearing 101 and the speedometer 104 to produce a substantially steady rotation of the speedometer operating shaft.

The arm 90 is provided with an index 107 reading on the position scale 78', and a pointer 108 extends in the opposite direction to read on the oppositely graduated position scale 78" when the craft moves on the course L in the opposite direction (H to E) and uses the same laterally located transmitting station S-1. Obviously, the odometer 100 may be set to indicate the "trip" mileage or distance traversed between any selected points on the course L. The angle of drift is eliminated as a source of error, and the apparatus shown in Fig. 10 therefore gives substantially correct ground speed at any point of the course L indicated on the position scale 78 or 78'.

Figure 12:
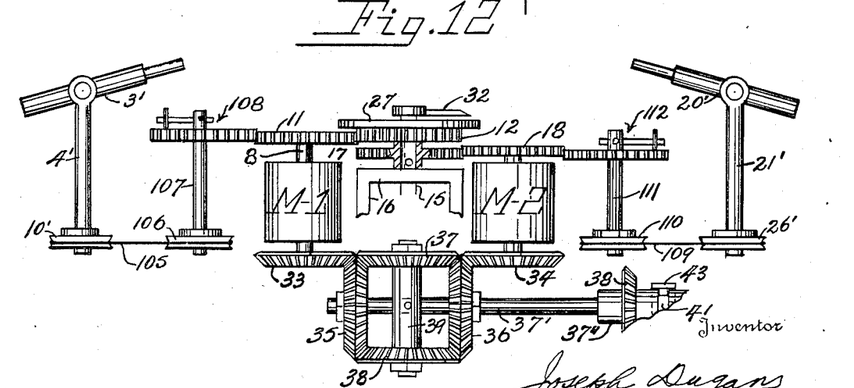
Fig. 12 is a fragmentary layout illustrating the use of sighting devices as substitutes for the directional radio antennae of Figs. 1 and 2.

In Fig. 12, the system is shown as employing sighting devices as direction determining devices instead of the directional antennae of Figs. 1 and 2. In Fig. 12, the telescope 3' is shown as mounted to rotate about the normally vertical axis of the shaft 4''. A grooved pulley 10' is fixed to the shaft 4' and is connected by the cable 105 to a similar grooved pulley 106 fixed to the shaft of a follow-up contact unit 108 controlling the operation of the follow-up motor M–1. Similarly, the telescope 20' is mounted to rotate about the normally vertical axis of the shaft 21', and a grooved pulley 26', fixed to the shaft 21', is connected by a cable 109 fixed to a similar grooved pulley 110 on the shaft 111 of another follow-up contact unit 112 controlling the operation of the motor M–2.

The follow-up contact units 108 and 112 are similar to that shown in Figs. 7 and 10 and require no further description since units of this type and their mode of operation are well known in this art. The steering and indicator mechanisms controlled by operation of the motors M–1 and M–2 are the same as illustrated in Figs. 1 and 2, and the corresponding elements have been given the same reference characters. In both forms of this invention, the operation of the steering and indicating mechanisms is effected by holding the direction determining devices (antennae or telescopes) trained on the objects used to define the course of the craft or to assist in determining the position, drift and ground speed of the craft along that course. This matter is shown and described briefly in this application to emphasize the fact that the invention is not limited to the use of directional radio antennae, and to form a basis for the use of the broad expression "direction determining devices" in the claims appended hereto.

Figure 13:
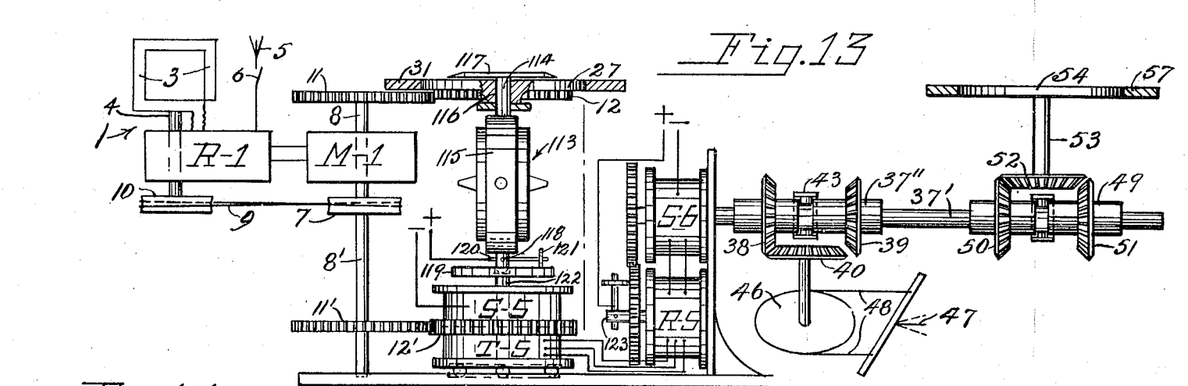
Fig. 13 is a diagrammatic layout illustrating a system in which a directional gyroscope replaces one of the radio compasses of the system shown in Figs. 1 and 2.
Figure 14:
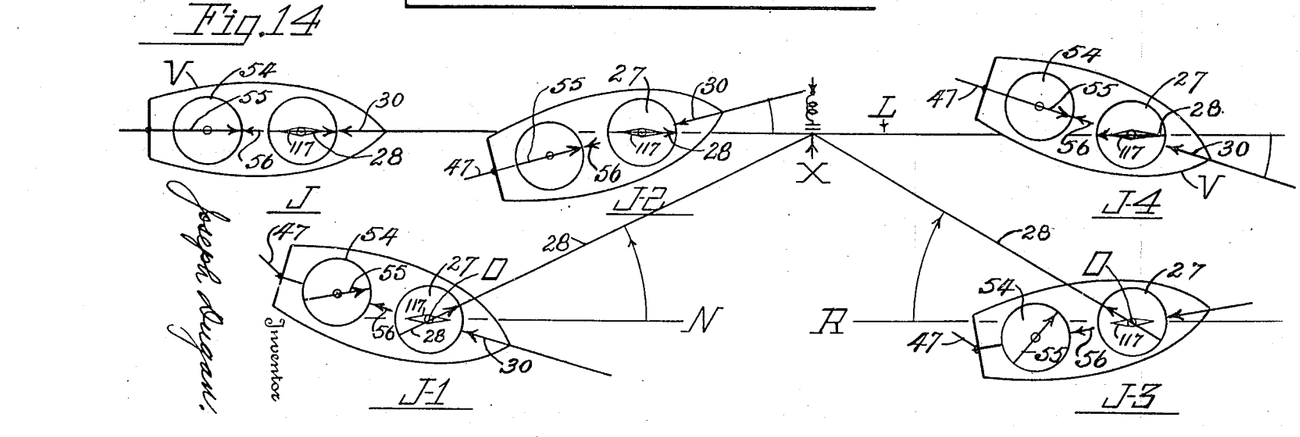
Fig. 14 is an explanatory diagram.

In the system as illustrated in Figs. 13 and 14, a directional gyroscope 113 is substituted for the radio compass 2 of the apparatus shown in Figs. 1 and 2. The object of this form of the invention is to steer the craft in drift-corrected movement in a predetermined direction along any desired compass course through a single radio transmitter. In this apparatus, the self-orienting radio compass 1 is retained in its entirety, with the shaft 37' and the clutch controlled steering and indicating mechanisms connected operably thereto as shown in Figs. 1, 2 and 3. As is well known in this art, the directional gyro must be periodically compared with a magnetic compass and reset whenever found necessary. The caging and setting mechanism is also well known, and is therefore not illustrated or described herein.

As shown in Fig. 13, the pivot shaft 114 extends radially from the vertical ring 115 and through the bearing 116 for the gear 12 and dial 27. A direction indicating pointer 117 is fixed to the upper end of the shaft 114 and extends in opposite directions over the dial 27. The lower pivot shaft 118 is supported in a step bearing on a dial 119 and has a conducting arm 120 provided with a trolley 121 rolling over conducting segmental plates (not shown) similar to those shown in Fig. 10 and similarly arranged with their adjacent ends separated by the usual central strip of insulation.

The dial 119 is secured to the shaft 122 of the follow-up motor S–5, and its segmental plates are connected to this motor's field windings as indicated in Fig. 10. The motor S–5 has a transmitter T–5 fixed thereto with the shaft 122 forming a common rotor shaft for both motor and transmitter. The motor S–5 and transmitter T–5 are rotated bodily about the axis of their common rotor shaft 122 by means of the ring gear 12' and the gear 11' fixed to an extension 8' of the radio compass shaft 8. Obviously, the motor S–5 and transmitter T–5 rotate in synchronism with antenna 3 and the dial 27.

The gyro 113 prevents the shaft 122 from rotation with the motor and transmitter stators, so that the transmitter T–5 transmits the angle of rotation of its stator about the fixed rotor to a repeater R–5 suitably mounted in fixed position on the craft.

The repeater R–5 is similar to the repeater R–4 of Figs. 7 and 10, and controls the operation of the follow-up motor S–6 in the same manner as repeater R–4 controls the operation of servomotor S–4. The motor S–6 is suitably connected to the shaft 37' to operate the rudder and indicator control gearing in the manner illustrated in Figs. 1, 2 and 3.

The necessity for the use of the clutch mechanism in the apparatus illustrated in Fig. 13 will become apparent from consideration of Fig. 14. Let it be assumed that the craft V starts from the position J (Fig. 14) toward the transmitter X on the course L, with the fore-and-aft axis of the craft and pointers 28, 55 and 117 all lined up on said course. In the absence of side winds, these indicator conditions would obtain until the craft arrived at the transmitter X.

Let it be assumed that the craft is located at some position J–1 laterally displaced from the course L through the transmitter X, that the receiver R–1 of the radio compass is tuned to the frequency of the transmitter X, and that the directional gyro has been set for some desired compass course through the transmitter. The indicator 117 of the gyro will be parallel to the course L, and the pointer 28 on dial 27 will be arranged at the angle NOX to the indicator 117 and the compass course through the transmitter X. To steer the craft from position J–1 on to the course L, it will obviously be necessary to rotate the rudder clockwise from zero-center position through an angle proportional to the angle NOX. Then, as the craft approaches the course L, the angle NOX decreases until it finally vanishes when the craft arrives at the course and the lines NO and OX coincide; that is, when the gyro indicator alines with the line 28 on the dial 27 and the indicator 55 alines with the lubber-line 56. These conditions obtain when the craft arrives at the position J–2 on the set compass course and is "crabbing" along the course toward the transmitter X with drift automatically corrected.

Under the conditions just described, it is evident that the dial 27 and transmitter T–5 must have been rotated counterclockwise through the angle NOX from the compass course defined by the gyro indicator 117. Since the rotor shaft 122 of the transmitter is held stationary by the gyro 113, the angle transmitted to the repeater R–5 is a clockwise rotation of the fixed rotor shaft 122 relative to its moving stator. This causes a clockwise rotation of the rotor shaft 123 in the repeater R–5 and a counterclockwise rotation of the shaft 37' which may be considered as the rotor shaft of motor S–6. From inspection of Fig. 13, it is evident that this counterclockwise rotation of shaft 37' would cause a counterclockwise, instead of the necessary clockwise, rotation of the rudder 47 through an angle proportional to the angle NOX. It will therefore be necessary to shift the clutch mechanism of Figs. 3 and 13 to cause engagement of the gears 39 and 51 with the gears 40 and 52, respectively, in order to steer the craft from the position J-1 on to the course L toward the transmitter X.

If the craft be located in the position J-3 and in movement away from the transmitter X, it is evident that the tuning of the receiver R-1 to the frequency of the transmitter X will cause clockwise rotation of the indicator 28 through the angle ROX relative to the setting of the gyro indicator 117. Tracing this rotation through the same elements to the shaft 37', we find the shaft 37' now rotating clockwise through the angle ROX. The position of the gearing shown in Fig. 13 on shaft 37' is therefore correct for rotating the rudder 47 through an angle proportional to the angle ROX to steer the craft on to the course L and away from the transmitter X.

As the craft recedes from the transmitter X with its rudder set clockwise in proportion to the angle ROX, this angle becomes smaller and smaller until it finally vanishes when the craft arrives at the course L and the lines RO and OX coincide; that is, when the gyro indicator 117 alines with the line 28 on dial 27 and the indicator 55 alines with the lubber-line 56. Whether the steering be effected manually or automatically, the rudder 47 will aline with the fore-and-aft axis of the craft, the pointer 55 will aline with the lubber-line 56, with the craft "crabbing" along the course L away from the transmitter X with drift automatically corrected.

Obviously, another automatic radio compass could be used with the apparatus of Fig. 13 to train on a transmitter located to one side of the compass course set up on the directional gyroscope and to operate ground speed and position indicating mechanism in the manner shown in Figs. 1, 7, 8, 9 and 10. It is not believed necessary to illustrate this arrangement in detail, since the necessary gearing and transmitter T would be identical with that employed to connect the compass 69 of Fig. 2 to the indicator mechanism operated by compasses 1 and 2.

While it is preferable to use a separate wire for the sense antenna in each self-orienting radio compass, the same effect may be secured by using the vertical effect of the directional antenna in the manner described on pages 96 to 98 of the third edition of Wireless Direction Finding, by R. Keen, published by Iliffe & Sons Ltd. of London, England; or described in Research Paper RP621—pages 734 to 741 of Bureau of Standards Journal of Research, vol. 11, December 1933.

The grooved pulley and cable connections between the follow-up motor of each radio compass and the shaft for the loop antenna may be replaced by any suitable mechanical, electrical, pneumatic or hydraulic transmission; and, the mechanical relays for the motors S-4, S-5 and S-6 may be replaced by the more efficient electronic relays such as are described in U. S. Patents 1,999,645 and 1,999,646, of April 30, 1935, or as are in common use in these radio compasses. The gearing connecting the follow-up motors is shown in the drawings as enlarged out of all reasonable proportion to the other elements of the system in order to facilitate the tracing of the relative movements of the various parts of the system.

The invention is not to be considered as limited in any way to any of the particular details of construction shown in the drawings, since it is obvious that many modifications may be made in the instrumentalities employed without departing from the spirit of the invention. Accordingly, the claims appended hereto are intended to cover any and all of such modifications as may fall within the spirit and scope of my invention.

What I claim is:

1. A dirigible craft; a direction determining device rotatable freely about a normally vertical axis on said craft; a second direction determining device rotatable about a normally vertical axis on said craft and settable to point in a fixed compass direction; and mechanism, controlled by the relative rotations of said devices about their said normally vertical axes, for steering the craft in a direction to effect coincidence of the vertical planes containing the direction lines of both devices with each other and with any object without the craft on which the first named device is held trained and in drift-corrected movement in a predetermined direction along the compass course passing through said object and determined by the compass setting of the second named device.

2. A dirigible craft; a radio transmitter without said craft; a radio receiver on said craft tuned to the frequency of said transmitter, and including a directional antenna rotatable about a normally vertical axis on said craft and means connected to said antenna and controlled by the output of said receiver for holding the antenna trained on said transmitter; a directional gyroscope rotatable about a normally vertical axis on said craft and settable to point in any desired compass direction; and means, controlled by the relative rotations of said antenna and gyroscope about their normally vertical axes, for steering the craft on to and in drift-corrected movement in a predetermined direction along a compass course passing through said transmitter and determined by the setting of said directional gyroscope.

3. A dirigible craft; steering means for said craft; two radio transmitters of different frequencies spaced apart to define for said craft a course lying in a vertical plane passing through said transmitters; two radio receivers mounted on said craft and adapted to be tuned to the frequency of either transmitter but each tuned to the frequency of a different transmitter, each receiver including a directional antenna rotatable about a normally vertical axis; a reversible motor connected to, and controlled only by the output of, one of said receivers; means connecting said motor to the directional antenna of said receiver to turn and hold the same trained on the transmitter to which said receiver is tuned; a reversible motor connected to, and controlled only by the output of, the other receiver; means connecting the last named motor to the directional antenna of that other receiver to hold that last named antenna trained on the other transmitter; and mechanism, including differential gearing, connecting said motors to said steering means to steer the craft on to and in drift-corrected movement along said course in a direction determined by the transmitter frequencies to which the respective receivers are tuned.

4. The apparatus set forth in claim 3 in combination with a pilot director having two indicators rotatable on said craft; means connecting one of said indicators to one of said motors to rotate that indicator in synchronism with the directional antenna connected to said motor; and means connecting the other indicator to the other motor to rotate that other indicator in synchronism with the other directional antenna; said indicators being mounted to aline with each other only when the craft is located on said course.

5. The apparatus set forth in claim 3 in combination with a steering indicator having a fixed lubber-line and a pointer movable toward and from said lubber-line; and means connecting said pointer to said mechanism to cause the pointer to register with said lubber-line only when the craft is located on said course.

6. A dirigible craft having steering mechanism; three radio transmitters of different frequencies spaced apart at known distances without the craft from each other to form a triangle; three radio receivers on said craft adapted to be tuned to the frequencies of any of said transmitters but each tuned to the frequency of a different transmitter, each receiver including a directional antenna rotatable about a normally vertical axis; a reversible motor connected to, and controlled by the output of, one of said receivers, means connecting said motor to the directional antenna of that receiver to turn and hold said antenna trained on the transmitter to which its receiver is tuned; a reversible motor connected to, and controlled by the output of another of, said three receivers; means connecting the second named motor to the directional antenna of that other receiver to turn and hold the same trained on the transmitter to which that other receiver is tuned; means including differential gearing connecting said motors to said steering mechanism to steer the craft on to and in drift-corrected movement along a straight course passing through the two transmitters on which the two directional antennas are held trained by said motors and in a direction along said course determined by the transmitter frequencies to which the respective receivers are tuned; a third reversible motor connected to, and controlled by the output of the remaining receiver; means connecting the last named motor to the directional antenna of that remaining receiver to turn and hold the same trained on the remaining transmitter; a pilot director fixed to said craft and having three indicators rotatable about a common axis thereon; and separate means connecting each of said motors individually to a separate one of said indicators to rotate each indicator in synchronism with the directional antenna to which its connected motor is also connected; said indicators and directional antennas being arranged to be maintained constantly by said motors in the same angular relation to each other as the angular relation between the vertical planes passing through said craft and the three radio transmitters.

7. The apparatus defined by claim 6 in which said pilot director comprises: a dial controlled by one of the two first named motors to rotate on said craft and having an indicator extending across a diameter of the dial, a second indicator controlled by the other of the two first named motors to rotate about the center of said dial to aline with the dial indicator only when the craft is located on said course, and a third indicator controlled by the remaining motor to rotate about the common axis of the other two indicators, said dial being provided with a scale cooperating with the third indicator to indicate the position of the craft on said course.

8. A dirigible craft; three direction determining devices, each rotatable about a normally vertical axis on said craft; and means, controlled by holding said devices trained separately on three objects spaced apart without the craft at known distances from each other, to form a triangle, for steering the craft on to and in drift-corrected movement in a predetermined direction along a straight course passing through any selected two of said objects, and for continuously indicating the position of the craft on said course.

9. The apparatus set forth in claim 8 in combination with mechanism controlled by said means for indicating the ground speed of the craft at the position indicated.

10. The apparatus set forth in claim 8 in combination with mechanism controlled by said means for indicating the distance traversed by said craft along said course from any selected point on said course.

11. A dirigible craft; three direction determining devices, each rotatable about a normally vertical axis on said craft; and means, controlled by holding said devices trained separately on three objects spaced apart without the craft at known distances from each other to form a triangle, for steering the craft on to and in drift-corrected movement in a predetermined direction along a straight course passing through any selected two of said objects, and for continuously indicating the position of the craft on that course and the angle of drift of the craft at the position indicated.

12. A dirigible craft having a rudder normally alined with the fore-and-aft axis; mechanism for operating said rudder; two radio transmitters of different frequencies spaced apart to define a course; two radio receivers on said craft adapted to be tuned to the frequency of either transmitter but each tuned to the frequency of a different one of said transmitters, each receiver including a directional antenna rotatable about a normally vertical axis; a reversible motor connected to, and controlled by the output of, one of said receivers; means connecting said motor to the directional antenna of said receiver to turn and hold the same trained on the transmitter to which said receiver is tuned; a reversible motor connected to, and controlled by, the output of the other receiver; means connecting the second named motor to the directional antenna of that other receiver to turn and hold that last named antenna trained on the other transmitter; and means including differential gearing connecting said motors to said mechanism to turn the rudder, responsive to "off-course" condition of the craft, in the direction required to steer the craft on to and in drift-corrected-movement in a predetermined direction along said course, and to maintain the rudder inclined to said fore-and-aft axis at an angle proportional to the difference between the exterior and interior opposite angles at the base of the triangle formed with said course by straight lines drawn to the craft from said transmitters when the craft is located outside the zone lying between said transmitters and bounded by vertical planes perpendicular to said course and passing through said transmitters, the direction of movement of the craft along the course being determined by the transmitter frequencies to which the respective receivers are tuned.

13. A dirigible craft having a rudder normally alined with the fore-and-aft axis; mechanism for operating said rudder; two radio transmitters of different frequencies spaced apart to define a course; two radio receivers on said craft adapted to be tuned to the frequency of either transmitter but tuned to the frequency of a different one of said transmitters, each receiver including a directional antenna rotatable about a normally vertical axis; a reversible motor connected to, and controlled by the output of, one of said receivers; means connecting said motor to the directional antenna of said receiver to turn and hold the same trained on the transmitter to which its receiver is tuned; a reversible motor connected to, and controlled by, the output of the other receiver; means connecting the second named motor to the directional antenna of that other receiver to turn and hold the same trained on the other transmitter; and means including differential gearing connecting said motors to said mechanism to turn the rudder, responsive to "off course" condition of the craft, in the direction required to steer the craft on to and in drift-corrected movement in a predetermined direction along said course, and to maintain the rudder inclined to said fore-and-aft axis at an angle proportional to the sum of the angles at the base of the triangle formed with said course by straight lines drawn to the craft from said transmitters when the craft is located in the zone lying between said transmitters and bounded by vertical planes perpendicular to said course and passing through said transmitters, the direction of movement of the craft along said course being determined by the transmitter frequencies to which the respective receivers are tuned.

14. A dirigible craft; steering means for said craft; two direction determining devices, each rotatable about a normally vertical axis on said craft; mechanism controlled by the rotation of said devices about said axes for operating said steering means; a pilot director including two indicators rotatable on said craft; means for transmitting the rotation of one of said devices to one of said indicators; and means for transmitting the rotation of the other device to the other indicator, said indicators being mounted on said craft to aline substantially with each other upon rotation of said devices about their said vertical axes to predetermined relative positions defining the course for the craft.

15. A dirigible craft; steering means for said craft; two direction determining devices, each rotatable about a normally vertical axis on said craft; mechanism controlled by the rotation of said devices about said axes for operating said steering means; a pilot director including two indicators rotatable about a common axis on said craft; means for transmitting the rotation of one of said devices to one of said indicators; means for transmitting the rotation of the other device to the other indicator, said indicators being mounted on said craft to aline substantially with each other upon rotation of said devices about their said vertical axes to predetermined relative positions defining the course for the craft.

16. A dirigible craft; steering means for said craft; two direction determining devices, each rotatable about a normally vertical axis on said craft; mechanism connected to, and controlled only by the rotation of said devices about said axes for operating said steering means; a steering indicator having a fixed lubber-line and a pointed movable toward and from said lubber-line; and means connecting said pointer to said mechanism to cause said pointer to register with said lubber-line upon rotation of said devices about their said vertical axes to predetermined relative positions defining the course for the craft.

17. A dirigible craft; two direction determining devices, each mounted to rotate freely about a normally vertical axis on said craft and to be trained independently in all directions in azimuth; and mechanism connected to, and controlled by the relative rotations of, said devices only about their said vertical axes for steering the craft in directions to cause the direction lines of said devices to move into, and be maintained in, a vertical plane passing through any two objects spaced apart to define a course for said craft and upon which said devices are separately held trained.

18. The herein described method of automatically steering a dirigible craft from any location on to and along a straight course passing in a predetermined compass direction through a source of radiant energy, which comprises: visually setablishing on said craft the desired line of compass direction; receiving energy from said source; continuously and visually establishing from said received energy and independently of the compass heading of said craft the line of direction from the craft to said source; and controlling in accordance with the such received energy automatically the steering of the craft to effect and maintain substantial coincidence between said lines.

19. The herein described method of automatically steering a dirigible craft from any location on to and along a straight course passing in a predetermined compass direction through a source of radiant energy, which comprises: visually establishing on said craft the desired line of compass direction; receiving energy from said source; continuously and visually establishing from said received energy and independently of the compass heading of said craft the line of direction from the craft to said source; measuring the angle between said lines of direction; and controlling in accordance with such measurement automatically the steering of the craft from any location on to and along said course.

JOSEPH DUGAN.